Patented Mar. 1, 1932

1,847,656

UNITED STATES PATENT OFFICE

EDOUARD M. KRATZ, OF CHICAGO, ILLINOIS, ASSIGNOR TO MARSENE PRODUCTS CO., OF GARY, INDIANA, A CORPORATION OF ILLINOIS

COMPOSITION FOR MAKING TRANSPARENT SHEET MATERIAL

No Drawing. Application filed May 3, 1930. Serial No. 449,696.

This invention relates to a composition for making transparent sheet material which can be stored for an indefinite period of time without change of color or the development of an offensive odor.

It has been proposed to form transparent sheet material from a gelatine-sulphonated oil base, the oil being of vegetable or animal origin, preferably castor oil. See, for instance, my co-pending case, Serial No. 10,962, filed February 21, 1925. While a sheet material composed of such a base possesses many desirable characteristics and is of greater value than is a sheet formed entirely of gelatine, it nevertheless has some slight tendency to change color and develop an offensive odor which renders the material objectionable for use as food wraps.

The odor can be, for the most part, attributed to the sulphonated animal or vegetable oil oxidizing and becoming rancid, which is particularly true if Turkey red oil is used. The deterioration or decomposition of the sulphonated oil progressively increases over a period of time, and, as a result, sheet material containing such sulphonated oils, if it is to be used for wrapping food stuffs, can be stored away for only a limited period.

Furthermore, transparent sheets of the above composition have a slight bent toward developing an undesirable yellowish color, depending to a large extent upon the temperature of the storage space and the quality of the gelatine employed. The particular property of the gelatine affecting its quality in this regard is its pH value, in general, the lower the pH, the greater the tendency for the sheets to turn yellow.

I have now found that I can produce a transparent sheet material free from the above objections by substituting for the sulphonated animal or vegetable oils, sulfonated petroleum hydrocarbons.

It is, accordingly, an object of this invention to provide a composition for forming transparent sheet material which will not develop an offensive odor upon standing for any length of time.

It is a further object of this invention to provide a composition for forming transparent sheet material which will retain its original color indefinitely.

Other and further important objects of this invention will become apparent from the following description and appended claims.

The composition I employ for making the transparent sheets of this invention comprises gelatine and a plasticizer consisting of a high-grade water white mineral oil and a sulphonate of a saturated, aliphatic petroleum hydrocarbon. The particular sulphonated petroleum hydrocarbons employed are the sulphonated naphthenic acids which are obtained as residues in the purification of petroleum distillates by means of sulphuric acid. Preferably, these compounds are treated to remove impurities in order to produce a sheet of desired clarity. For the same reason, the mineral oils employed in conjunction with the sulphonated naphthenic acids should be pure grades of light water white mineral oil, such as Russian white oil.

The proportions of the various ingredients of my composition may vary quite considerably, but are limited more or less by the quality and pH value of the gelatine. A sheet having the most desirable characteristics will have a pH of about 5 to 6, and preferably 6.2. This acidity is best obtained in the finished product by using a gelatine with a pH of 6.2 and a mixture of mineral oil and sulphonated naphthenic acids of a like pH value.

The amounts of sulphonated naphthenic acid and mineral oil in a mixture of the two may range from 40 to 80% naphthenic acid and 20 to 60% mineral oil. In compounding this mixture with gelatine, the amount of gelatine in the final composition may vary from 80 to 40%. Generally speaking, the amounts of sulphonated naphthenic acid-mineral oil used will depend upon the plasticity and flexibility of the finished product desired and can be varied at will to meet different requirements in regard to these properties. The upper limit of mineral oil is restricted to the point where precipitation or spewing of the mineral oil occurs and this point is controlled by the quality and pH of the gelatine.

The following example, in which parts by weight are given, serves to more particularly illustrate my invention:

4 parts of gelatine (pH 6.2)
1 part of sulphonated naphthenic acid-mineral oil (pH 6.2)

The sulphonated naphthenic acid-mineral oil mixture is made up as follows:

6 parts of sulphonated naphthenic acids
4 parts of a light water white mineral oil.

It is, of course, to be understood that the proportions in this, my preferred, form of composition may be widely varied, as indicated above.

In forming the composition, a gelatine solution is prepared from calf stock having a pH of between 6 and 6.5. The desired pH of the gelatine solution may be obtained by adding the requisite amount of hydrochloric acid. A mixture of sulfonated naphthenic acids and a water white mineral oil is then made up and its pH regulated to the proper value. This mixture is then added to the gelatine solution.

It will thus be appreciated that I have devised a composition for forming transparent sheet material which will result in a product free from the objections as regards odor, changes in color, hardness and brittleness and which is relatively cheap and simple to manufacture.

It is, of course, to be understood that various details of my disclosure may be changed without departing from the spirit of this invention, and I, therefore, do not purpose to be limited in the patent granted except as necessitated by the prior art.

I claim as my invention:

1. A composition for forming transparent sheet material comprising gelatine and a sulphonated aliphatic, saturated petroleum hydrocarbon.

2. A composition for forming transparent sheet material comprising gelatine, a mineral oil, and a sulphonate of an acid of an aliphatic, saturated petroleum hydrocarbon.

3. A composition for forming transparent sheet material comprising gelatine and a sulphonated naphthenic acid.

4. A composition for forming transparent sheet material comprising gelatine, a water white mineral oil and a sulphonated naphthenic acid.

5. A composition for forming transparent sheet material comprising gelatine having a pH of 6.2 and a mixture of a sulphonated naphthenic acid and a water white mineral oil of the same pH value.

6. A composition for forming transparent sheet material comprising 40 to 80% of gelatine and 60 to 20% of a mixture of a sulphonate of an acid of a saturated petroleum hydrocarbon and a mineral oil.

7. A composition for forming transparent sheet material comprising 40 to 80% of gelatine and 60 to 20% of a mixture of a sulphonated naphthenic acid and a light water white mineral oil.

8. A composition for forming transparent sheet material comprising 40 to 80% of gelatine and 60 to 20% of a mixture made up of 40 to 80% of a sulphonated naphthenic acid and 60 to 20% of a white water mineral oil, said composition having a pH of 6.2.

9. A composition for forming transparent sheet material comprising 80% of gelatine, 12% of a sulphonated naphthenic acid and 8% of a light water white mineral oil.

10. A plasticizer for use in forming transparent gelatine sheet material comprising a sulphonated aliphatic saturated petroleum hydrocarbon, and a water white mineral oil.

11. A plasticizer for use in forming a transparent gelatine sheet material comprising 40 to 80% of a sulphonated naphthenic acid and 60 to 20% of a water white mineral oil.

In testimony whereof I have hereunto subscribed my name at Chicago, Cook County, Illinois.

EDOUARD M. KRATZ.